US008627488B2

(12) United States Patent
Cormode et al.

(10) Patent No.: US 8,627,488 B2
(45) Date of Patent: Jan. 7, 2014

(54) METHODS AND APPARATUS TO ANONYMIZE A DATASET OF SPATIAL DATA

(75) Inventors: Graham R. Cormode, Morristown, NJ (US); Cecilia M. Procopiuc, Summit, IN (US); Divesh Srivastava, Summit, NJ (US); Entong Shen, Raleigh, NC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 48 days.

(21) Appl. No.: 13/311,388

(22) Filed: Dec. 5, 2011

(65) Prior Publication Data
US 2013/0145473 A1    Jun. 6, 2013

(51) Int. Cl.
*G06F 21/24* (2006.01)
*G06F 21/10* (2013.01)
*G11B 20/00* (2006.01)
*G06F 21/72* (2013.01)

(52) U.S. Cl.
CPC .......... *G06F 21/10* (2013.01); *G11B 20/00086* (2013.01); *G06F 21/72* (2013.01)
USPC .................. 726/26; 726/27; 726/28; 726/29; 726/30; 713/189

(58) Field of Classification Search
USPC ............... 726/26–30; 713/165–167, 189, 193
See application file for complete search history.

(56) References Cited

U.S. PATENT DOCUMENTS

| | | | |
|---|---|---|---|
| 6,327,535 B1 | 12/2001 | Evans et al. | |
| 7,698,250 B2 | 4/2010 | Dwork et al. | |
| 7,747,704 B2 | 6/2010 | Parupudi et al. | |
| 2010/0094760 A1* | 4/2010 | Gouget et al. | 705/71 |
| 2010/0100307 A1* | 4/2010 | Kim | 701/119 |
| 2010/0198826 A1 | 8/2010 | Petersen et al. | |
| 2010/0198870 A1 | 8/2010 | Petersen et al. | |
| 2011/0138192 A1* | 6/2011 | Kocher et al. | 713/189 |
| 2011/0208763 A1 | 8/2011 | Mcsherry et al. | |
| 2011/0213807 A1* | 9/2011 | Mattsson | 707/802 |
| 2011/0238611 A1 | 9/2011 | McSherry et al. | |
| 2011/0282865 A1 | 11/2011 | Talwar et al. | |
| 2011/0283099 A1 | 11/2011 | Nath et al. | |
| 2012/0172050 A1* | 7/2012 | Ledlie et al. | 455/456.1 |

OTHER PUBLICATIONS

S. Bhagat, B. Krishnamurthy, G. Cormode, D. Srivastava "Class-based graph anaonymization for social network data", VLDB, Aug. 24-28, 2009, Lyon, France.*
G. Cormode, D. Srivastava, T. Vu, Q. Zhang, "Anonymizing bipartite graph data using safe groupings", Springer-verlag, 2009; also published in the VLDB Journal, 19:115-119, 2010.*
F. McSherry, "Privacy integrated queries", SIGMOD, Jun. 29-Jul. 2, 2009, Providence, Rhode Island, USA.*
N. Mohammed, B. C. M. Fung, R. Chen, P. S. Yu, "Differentially private data release for data mining", KDD'11, Aug. 21-24, 2011, San Diego, California, USA.*

(Continued)

*Primary Examiner* — Catherine Thiaw
(74) *Attorney, Agent, or Firm* — Hanley, Flight & Zimmerman, LLC.

(57) ABSTRACT

Methods and apparatus are disclosed to anonymize a dataset of spatial data. An example method includes generating a spatial indexing structure with spatial data, establishing a height value associated with the spatial indexing structure to generate a plurality of tree nodes, each of the plurality of tree nodes associated with spatial data counts, calculating a localized noise budget value for respective ones of the tree nodes based on the height value and an overall noise budget, and anonymizing the plurality of tree nodes with a anonymization process, the anonymization process using the localized noise budget value for respective ones of the tree nodes.

21 Claims, 10 Drawing Sheets

(56) References Cited

OTHER PUBLICATIONS

The National Science Foundation, Award Abstract #0747247 Career: Trust and Privacy Management for Online Social Networks, latest amendment date: Jun. 22, 2011, 2 pages.

Ali Inan et al., Private Record Matching Using Differential Privacy, Mar. 2010, 12 pages.

Wikipedia, Quadtree, retrieved from www.wikipedia.org on Nov. 22, 2011, 4 pages.

Nate Anderson, "Anonymized" data really isn't—and here's why not, arstechnica.com, printed on Nov. 21, 2011, 2 pages.

\* cited by examiner

300

US 8,627,488 B2

METHODS AND APPARATUS TO ANONYMIZE A DATASET OF SPATIAL DATA

GOVERNMENT LICENSE RIGHTS

This invention was made with government support under Grant Number CNS-0747247 awarded by the National Science Foundation. The government has certain rights in the invention.

FIELD OF THE DISCLOSURE

This disclosure relates generally to data security, and, more particularly, to methods and apparatus to anonymize a dataset of spatial data.

BACKGROUND

Data collected and/or otherwise cultivated by a business may permit one or more business services to occur in a manner tailored to one or more corresponding subscribers. The collected data may relate to subscriber behavior(s) and/or other details to allow the one or more services to satisfy subscriber expectations. In some examples, the collected data also includes information deemed private by the corresponding subscribers and, if revealed in a public manner, may expose the subscribers to risk and/or embarrassment.

DETAILED DESCRIPTION

Figure 1:
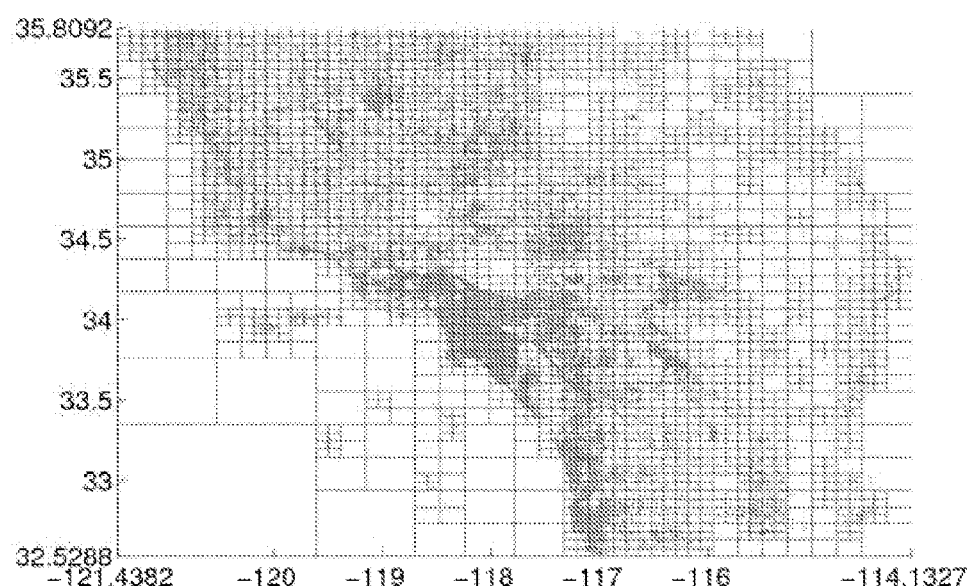
FIG. 1 is an example data-independent indexing structure to privatize a dataset of spatial data.

Methods and apparatus are disclosed to anonymize a dataset of spatial data. An example method includes generating a spatial indexing structure with spatial data, establishing a height value associated with the spatial indexing structure to generate a plurality of tree nodes, each of the plurality of tree nodes associated with spatial data counts, calculating a localized noise budget value for respective ones of the tree nodes based on the height value and an overall noise budget, and anonymizing the plurality of tree nodes with an anonymization process, the anonymization process using the localized noise budget value for respective ones of the tree nodes.

Collected and/or cultivated data may include data that is spatial, such as mobility patterns associated with wireless subscribers. A business organization responsible for the collection, cultivation and/or maintenance of such data may pass the data between its own business units to facilitate one or more services for the subscribers. In other examples, the data may be outsourced to authorized recipients/entities in an effort to satisfy subscriber service expectations, such as providing the data associated with each subscriber to an outsourced call center that processes service call requests.

In the event the data is intercepted en-route to an authorized recipient (e.g., an outsourced call center), or if the data is wrongfully obtained via one or more hacking attempts, the one or more subscribers associated with the data may be at financial risk, may suffer embarrassment and/or one or more local and/or federal laws may result in service provider liability. In other examples, data having one or more elements deemed private may be useful for entities interested in generating one or more conclusions related to, for example, market research. For example, although a data set may include information deemed private, other aspects of the data that are non-private may be useful for generating aggregate conclusions related to the data set, such as a number of people that live in a certain geographical area, a number of people that use a particular cellular tower in a certain geographical area, etc. In the event that the data set is sanitized/anonymized to prevent one or more privacy concerns related to individuals associated therewith, distribution of the data set may occur without concern and provide utility to a user of the sanitized data set.

In other examples, original data may be processed to remove one or more pieces of information in an effort to maintain privacy expectations of one or more persons associated with the original data. For instance, social security numbers, street address information, etc., associated with people may be removed/deleted from database records to ensure privacy expectations are met. However, previous attempts to manually anonymize data have resulted in privacy concerns when a potential attacker has one or more other and/or disparate data sources to combine with the anonymized data. For example, the Massachusetts Group Insurance Commission released data associated with state employees that showed every hospital visit by those employees. Prior to releasing the data, the state removed obvious identifiers such as name, address and social security number. Additionally, despite public concerns for the release of the data, the Governor of Massachusetts assured the public that patient privacy would be maintained. However, graduate student efforts combined publically available voter records with the processed state employee hospital visit data to identify the Governor's unique hospital visit information from data that was previously deemed "anonymized."

Alternate techniques to transform a data set, such as a spatial data set (e.g., latitude/longitude coordinates associated with subscribers), from having sensitive data to anonymized data may include adding noise drawn from a random distribution. For example, the added noise is applied to each cell in a data grid (e.g., a grid over a geographical region of interest, such as a county) so that the original (true) data points in each grid are replaced with noise. However, the addition of noise may drown-out the remaining value to the data set to yield a geographical grid having non-zero noise values throughout. While the addition of noise may improve a degree of privacy associated with the data set, such privacy improvement may occur at the expense of data set utility.

Releasing data sets that do not compromise the privacy of data subjects may satisfy differential privacy rules if what can be learned from the released data does not substantially differ whether or not any given data from a particular individual is included. The term "differential privacy," as used herein with respect to published data, refers to data that is published in accordance with a privacy approach that seeks to increase (e.g., maximize) accuracy of data and/or queries against the data, while reducing (e.g., minimizing) the chances that someone can identify one or more particular records associated with the data. If published data complies with differential privacy, then the probability of output falling in a set of values is at most $e^\epsilon$ times the probability of the output falling in the set of values, given input that differs in the records of at most one individual.

In one example, $D_1$ and $D_2$ are two example neighboring datasets (e.g., $D_1$ and $D_2$ differ in only one tuple t), such that the absolute value of their difference is one, as shown in example Equation 1.

$$\|D_1 - D_2\| = 1 \qquad \text{Equation 1.}$$

In some examples, Equation 1 is interpreted as meaning that t has different values in each of $D_1$ and $D_2$, while in other examples, Equation 1 is interpreted as meaning that t is present in only one of the two datasets. If A refers to a randomized algorithm and/or process performed over the datasets, and S refers to an arbitrary set of possible outputs of process A, then process A is said to be $\epsilon$-differentially private if example Equation 2 is satisfied for all S.

$$Pr[A(D_1) \in S)] \leq e^\epsilon PR[A(D_2) \in S] \qquad \text{Equation 2.}$$

Generally speaking, example Equation 2 indicates that no individual tuple can significantly affect released information because an output distribution generated by process A is nearly the same whether or not any tuple of interest is present in the dataset. Given the process A, which may include randomization component(s), different answers will result for each iteration of process A that processes the same inputs, which further reveals a probability distribution (Pr) over a set of outputs. The noise parameter $\epsilon$ controls how much privacy is afforded (e.g., to an individual, to a privatization process, etc.). As the value of $\epsilon$ goes down, then privacy guarantees and/or likelihood of privacy increases, but at the expense of additional noise.

Example methods and apparatus disclosed herein develop private spatial decompositions (PSDs) using one or more spatial indexing methods in which to organize one or more datasets of interest. Example spatial indexing methods describe a data distribution and include, but are not limited to, quadtrees, R-trees, B-trees, and kd-trees in which example methods and apparatus disclosed herein partition the spatial data into smaller regions in a manner that complies with differential privacy guarantees (choosing splitting points). Additionally, for each cell of an example PSD, noisy counts are generated to replace true counts in a manner that preserves differential privacy guarantees. Example PSDs disclosed herein balance practicality of privacy concerns with utility concerns so that anonymized data preserves privacy expectations while still allowing one or more useful queries to be performed on the anonymized data.

Example spatial indexing methods disclosed herein include data-independent decompositions, data-dependent decompositions and hybrid decompositions that include both data-independent and data-dependent aspects. FIG. 1 illustrates an example data-independent decomposition referred to as a quadtree 100. As used herein, the term quadtree refers to a decomposition that initially includes four partitions, but may thereafter recursively split any number of additional times for further depth. In the illustrated example of FIG. 1, the quadtree 100 has a depth of six and is overlaid on a geography of interest in which data points of interest are darkened (e.g., a presence of people in the cell), and data voids are light colored (e.g., an absence of people in the cell). The geography of interest in the illustrated example of FIG. 1 is a portion of California, in which the recursive division produces cells that are both sparse and dense.

Figure 2A:
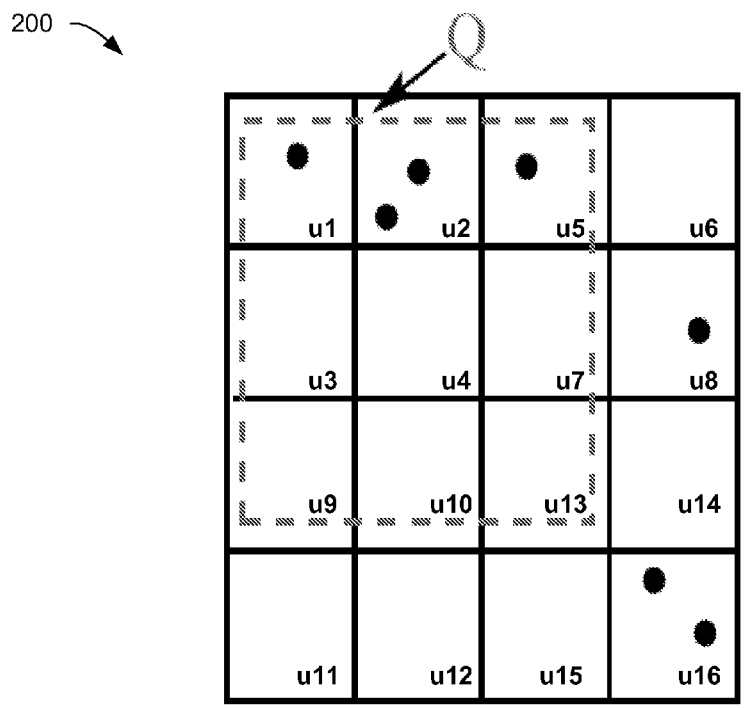
FIG. 2A is an example portion of a quadtree to privatize a dataset of spatial data.

Spatial decompositions may be represented as a hierarchical tree decomposition of a geometric space into each smaller area (e.g., each cell) that have corresponding data points. To illustrate, FIG. 2A is an example quadtree 200 having a depth of three and seven data points within the cells, each of which is referred to herein as a leaf (u), and the corresponding data therein may be deemed private. In the illustrated example of FIG. 2A, a portion of leaves u1 through u16 are selected in a query (Q) (i.e., leaves u1-u5, u7, u9, u10 and u13). The example seven data points are sometimes referred to herein as original data, and such potentially private data points are located in leaves u1, u2, u5, u8 and u16.

Figure 2B:
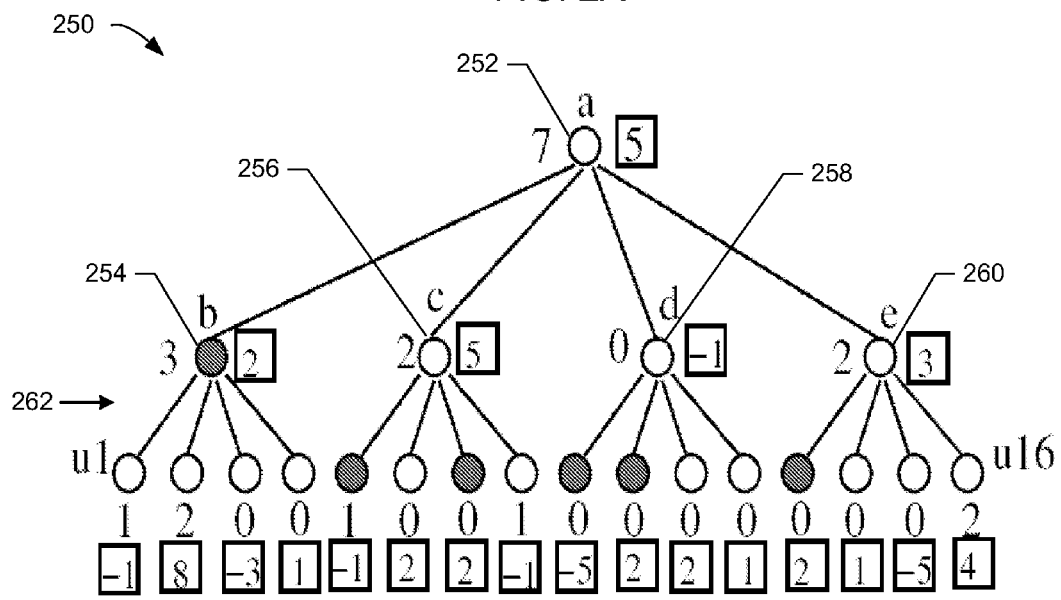
FIG. 2B is an example tree structure associated with the example quadtree of FIG. 2A.

FIG. 2B is an example hierarchical tree 250 corresponding to the quadtree 200 of FIG. 2A. A root 252 of the tree 250 is indicative of the entire four leaf by four leaf tree at node "a," which is further subdivided by a four-way split to generate nodes "b," 254, "c," 256, "d," 258 and "e" 260. Each of "b," 254, "c," 256, "d," 258 and "e" 260 includes four leaves in a last level 262 of the tree 250 (i.e., leaves u1 through u16). At the example root "a" 252 of the tree 250, a corresponding unmodified count of the data points is shown as "7." At the example node "b" 254 of the tree 250, a corresponding unmodified count of the data points within that node is shown as "3" because node "b" 254 includes leaves u1 through u4, which have three data points therein. In particular, leaf u1 illustrates a numeric indicator "1" and leaf u2 illustrates a numeric indicator "2" to reflect unmodified counts of original data from the dataset.

In the event the dataset shown in FIGS. 2A and 2B are published, the private data may place one or more subscribers, users, etc., at risk. As described in further detail below, example methods and apparatus disclosed herein apply one or more processes to an original dataset in a manner that complies with differential privacy requirements and/or expectations, as defined by example Equation 2. Briefly returning to the illustrated example of FIG. 2B, example methods and apparatus disclosed herein generate noisy counts, which are shown in square boxes, for each node of the original dataset so that publication will conform to differential privacy. In the example tree 250, sequential compositions along a path are calculated where node counts are independent of each other. For example, if an output of a first process associated with a first leaf is known, then a privacy guarantee of a second leaf is not affected if that second leaf is not a part of the same root-to-leaf path as the first leaf. To ensure the processed dataset complies with differential privacy requirements, example methods and apparatus disclosed herein apply a composition rule for all tree paths when selecting localized noise parameters $\epsilon_i$.

Let h denote the height of the tree, in which leaves have level zero (0) and the root has level h. If given a total privacy budget of noise parameter $\epsilon$, then each localized value of $\epsilon_i$ associated with each level i for $0 \leq i \leq h$ is determined in a uniform manner as shown in example Equation 3.

$$\epsilon = \Sigma_{i=0}^{h} \epsilon_i \qquad \text{Equation 3.}$$

In some examples, each localized value of $\epsilon_i$ may be established in a uniform manner in which each localized value is the same at each level. In other examples, localized values of $\epsilon_i$ may be dissimilar, which may include values equal to zero for level(s) associated with relatively low noisy counts.

An example PSD may be built by computing the original data counts of the example quadtree for each node. Counts for each node may be computed via any number of processes A, including a Laplace mechanism. Let $f(D)$ denote a numeric function over a dataset D. To release $f$ in a manner that complies with differential privacy that is guided by a budget noise parameter $\epsilon$, the dataset may be published in a manner consistent with example Equation 4.

$$L(D)=f(D)+X \qquad \text{Equation 4.}$$

In the illustrated example of Equation 4, X represents a random variable drawn from a Laplace distribution consistent with example Equation 5.

$$Lap\left(\frac{\sigma(f)}{\varepsilon}\right). \qquad \text{Equation 5}$$

In the illustrated example of Equation 5, the value of $\sigma(f)$ represents a sensitivity of $f$, which relates to a maximum change in $f$ when any single tuple of D changes. In particular, the sensitivity may be represented in a manner consistent with example Equation 6.

$$\sigma(f)=\max_{D1,D2:\|D1-D2\|=1}|f(D_1)-f(D_2)| \qquad \text{Equation 6.}$$

For data-independent trees/decompositions, in the event the structure of the index (e.g., the node rectangles) is publically released, there is no corresponding danger to a release of private data associated with any individual. Instead, the node counts are modified to preserve privacy, in which each node stores a number of data points that lie in a spatial cell associated therewith. Adding or deleting a single tuple changes the counts of all nodes on a path from the root to the leaf that contains that changed tuple. As such, to generate a tree that satisfies differential privacy, privacy guarantees for each individual node count are considered as a sequential composition. For example, assume $A_1, \ldots, A_t$ represents t processes such that Ai satisfies differential privacy for $1 \leq i \leq t$. A sequential composition of A1 through At satisfies differential privacy in a manner consistent with example Equation 7 to create the example PSD.

$$\epsilon=\Sigma_{i=1}^{t}\epsilon_i \qquad \text{Equation 7.}$$

A subsequent query on the PSD, such as the example tree 250 having the noisy values published, results in varying accuracy. For a query Q, an answer to that query computed over the private tree (i.e., the noisy values) is represented by $\tilde{Q}$. The private tree query $\tilde{Q}$ is a random variable and an unbiased estimator of the true answer (i.e., the node values not surrounded by boxes). The variance of $\tilde{Q}$ is a strong indicator of query accuracy, thus, the error measure may be represented in a manner consistent with example Equation 8.

$$Err(Q)=VAR(\tilde{Q}) \qquad \text{Equation 8.}$$

Unlike a tree over the original dataset having unmodified counts (e.g., counts without noise), the PSD may return any number of different results to a query Q. In the illustrated example of FIGS. 2A and 2B, an example query Q includes leaves u1-u4, u5, u7, u9, u10 and u13. The example query Q sums the noisy counts in the nodes to result in a value of two (2). However, if the count of node "b" 254 is replaced with a sum of corresponding children leaf counts, and replace the sum of node u5 and u7 by a difference between node "c" 256 and the sum of u6 and u8, the count results in a value of eight (8). The difference between each approach occurs because the noise is independent, and there are multiple ways to represent a query Q as a union or difference of node rectangles. As such, adding or subtracting corresponding noisy counts yields different results.

Based on such differing results, calculating query accuracy may be performed to guide localized noise parameters in an effort to improve accuracy. To analyze the error of a query Q (i.e., computing $\tilde{Q}$), let Y be a set of noisy counts, and let U be a set of nodes used to answer the query Q. The total variance is the sum of the node variances, as shown via example Equation 9.

$$Err(Q)=\Sigma_{u \in U}Var(Y_u) \qquad \text{Equation 9.}$$

Starting from the root, all nodes that intersect the query Q are visited and, if fully within the query Q boundary, a noisy count $Y_u$ is added to the answer $\tilde{Q}$. Each child of u that intersects with the query Q is visited, and the same procedure is performed (recursively) until the leaves of the tree structure are reached. In the event a leaf a intersects query Q, but it is not contained within the query boundary, a uniformity assumption is used to estimate a fraction of $Y_a$ to add to the answer $\tilde{Q}$. Let n(Q) be a number of nodes that contribute their counts to the answer $\tilde{Q}$. For each $0 \leq i \leq h$, let $n_i$ be the number of nodes at level i that are maximally contained in the query Q in a manner consistent with example Equation 10.

$$n(Q)=\Sigma_{i=0}^{h}n_i \qquad \text{Equation 10.}$$

The resulting value n(Q) bounds each node $n_i$, and may be used to guide one or more selections of the localized noise parameter $\epsilon_i$. Noise is independently generated in each node, and because the variance of the Laplace mechanism with the noise parameter $\epsilon_i$ is consistent with example Equation 11, then the error of a query Q may be shown in a manner consistent with example Equation 12.

$$Var(Lap(\varepsilon_i))=\frac{2n_i}{\varepsilon_i^2}. \qquad \text{Equation 11}$$

$$Err(Q)=\sum_{i=0}^{h}\frac{2n_i}{\varepsilon_i^2}. \qquad \text{Equation 12}$$

When developing the PSD with a uniform budget, localized noise parameters may be calculated in a manner consistent with example Equation 13.

$$\varepsilon_i=\frac{\varepsilon}{(h+1)}. \qquad \text{Equation 13}$$

However, query accuracy may be improved by applying a non-uniform budget strategy when building the PSD. By substituting an upper bound for the number of nodes at i ($n_i$), the corresponding minimized upper bound may be shown in a manner consistent with example Equation 14 subject to example Equation 3.

$$\frac{16\left(2^{\frac{(h+1)}{3}}-1\right)^3}{\varepsilon^2\left(\sqrt[3]{2}-1\right)^3} \leq \frac{2^{h+7}}{\varepsilon^2}. \qquad \text{Equation 14}$$

Example equation 14 is attained for the localized noise parameter $\epsilon_i$ in a manner consistent with example Equation 15.

$$\varepsilon_i = 2^{\frac{(h-i)}{3}} \varepsilon \frac{\sqrt[3]{2}-1}{2^{\frac{(h+1)}{3}}-1}. \qquad \text{Equation 15}$$

The bound of example Equation 14 suggests that reducing a value for the tree height h will also reduce a corresponding noise, but such variance bounds the error from noisy counts. An additional error consideration includes that due to a query Q that partly intersects some leaves (e.g., errors that arise from a uniformity assumption). In a worst case scenario, the error is proportional to a number of points in each leaf that is intersected by the query Q (e.g., intersect approximately $n_h=2^h$ leaves). On an average for an input having n points, each leaf may have $O(n/4^h)$ points per leaf assuming balanced leaf counts. As such, the error due to making the uniformity assumption occurs in a manner consistent with example Equation 17, which suggests that a greater benefit results from increasing the tree height h because the error grows as $O(n/2^h + 2^{h/3})$.

$$O\left(\frac{2^h n}{4^h}\right) = O\left(\frac{n}{2^h}\right). \qquad \text{Equation 17}$$

While example noise budget strategies described above include uniform noise allocation and geometric noise allocation, the noise budget strategies are not limited thereto. One or more alternate and/or additional strategies for dividing the noise parameter $\epsilon$ along a path are possible. In some examples, a quadtree may be built to a depth h and set $\epsilon_h = \epsilon$, in which the entire budget is allocated to the leaves, but none of the budget is allocated to intermediary nodes along a path. In this example, queries may be computed over a grid defined by the leaf regions and the hierarchical structure of the tree is not relevant to the outcome.

In other examples, budget conservation may be applied on a node-by-node basis. For some levels i, the noise parameter may be set to zero ($\epsilon_i=0$). As such, no corresponding counts would be released for nodes having a zero noise parameter, thereby allowing prior and/or subsequent nodes to use portion(s) of the noise budget $\epsilon$.

Figure 3:
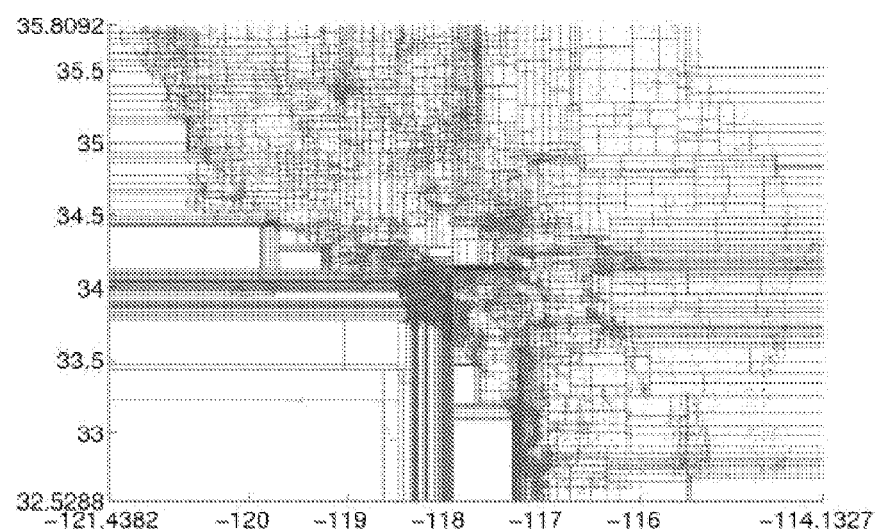
FIG. 3 is an example data-dependent indexing structure to privatize a dataset of spatial data.

In addition to data-independent trees derived from corresponding data-independent decompositions, such as the example quadtree 100 of FIG. 1, some spatial indexing methods are data-dependent. FIG. 3 illustrates an example data-dependent decomposition 300 referred to as a data-dependent quadtree and/or a k-dimensional tree (kd tree). Unlike the example data-independent quadtree 100 of FIG. 1, which generates cells (nodes and/or leaves) by a spatial division of a region of interest, the cells of the example kd tree 300 are generated in a manner based on the dataset distribution. In a non-private setting (e.g., when releasing the true data does not include any concern for protection), one or more nodes may be split based on one or more median calculations of the dataset. However, for privacy related concerns, releasing an exact median may reveal enough information to offend differential privacy requirements.

To compute an example private median for a given set of points (e.g., a dataset), let $C=\{x_1, \ldots, x_n\}$ be a set of n values in non-decreasing order in a range between a low value and a high value, in which the difference between the low and high values is M. The median value for the example dataset may be represented as $x_m$. In some examples, the Laplace mechanism may be applied to return $L(C)=x_n$, $+X$, where X is Laplace noise. However, the sensitivity of the median is of the same order of magnitude as the range M, and the noise value may dwarf $x_m$. At least one consequence of this noise value is that the noisy median is outside the range of the low value and high value, which prohibits useful division of the dataset.

To divide a dataset with a data-dependent spatial index, example methods and apparatus disclosed herein employ one or more of a smooth sensitivity approach, an exponential mechanism approach, a cell-based approach and/or a noisy mean approach. The example smooth sensitivity (SS) approach tailors the noise to be more specific to the example set C. However, one tradeoff of the SS approach over the Laplace mechanism is that it has weaker privacy guarantees. Assuming that a noise budget of interest $\epsilon$ is greater than zero ($0<\epsilon$), $\delta<1$, and example Equation 18 is true, then example Equations 19 and 20 define the smooth sensitivity of the median for C.

$$\xi = \frac{\varepsilon}{4(1+\ln(2/\delta))}. \qquad \text{Equation 18}$$

$$\sigma_s(\text{median}) = \max_{0 \le k \le n} (e^{-k\xi} \max_{0 \le t \le k+1} (x_{m+t} - x_{m+t-k-1})). \qquad \text{Equation 19}$$

$$SS(C) = x_m + \frac{2\sigma_s}{\varepsilon} \cdot X. \qquad \text{Equation 20}$$

In the illustrated example Equations 18, 19 and 20, X represents a random variable drawn from the Laplace distribution with parameter 1 and $\sigma_s = \sigma_s$ (median). Additionally, $x_i$ is deemed low when i<0, and $x_i$ is deemed high when i>n.

The example exponential mechanism (EM) that draws output values from a probability distribution over all possible outputs rather than adding random noise to the true values, as in Laplace mechanism approaches. Drawing the output values from a probability distribution satisfies differential privacy conditions when applied to the median. Assuming x is an element between low and high values, let rank(x) denote the rank of x in C. The example exponential mechanism returns x in a manner consistent with example Equation 21.

$$Pr[EM(C) = x] \propto e^{\frac{-\varepsilon}{2}|rank(x) - rank(x_m)|}. \qquad \text{Equation 21}$$

In the illustrated example of Equation 21, because all values x between two consecutive values in C have the same rank, they are equally likely to be chosen. As such, EM may be implemented by observing that it chooses an output from an interval consistent with example Equation 22, and a probability proportional to example Equation 23. Conditional on $I_k$ being chosen in the first step, EM returns a uniform random value in $I_k$.

$$I_k = [x_k, x_{k+1}]. \qquad \text{Equation 22}$$

$$|I_k| e^{\frac{-\varepsilon}{2}|k-m|}. \qquad \text{Equation 23}$$

The example cell-based approach imposes a fixed resolution grid over C, and then computes the median based on the noisy counts in the grid cells. When applied to a hierarchical decomposition, a fixed grid is computed over the entire dataset, then medians are computed from the subset of grid cells in each node. Cell counts have sensitivity of 1, and the accuracy depends on a degree of coarseness of the grid relative to the dataset distribution.

The example noisy mean replaces a median calculation with a mean calculation. A private mean may be computed privately by computing a noisy sum (e.g., with sensitivity M), and a noisy count (e.g., with sensitivity 1), and calculating a corresponding ratio.

The privacy guarantee and/or expectation of privacy of a data-dependent tree may be obtained by composing individual privacy guarantees for each median, in which each median consumes a portion of the overall privacy budget (noise budget) ($\epsilon$). As discussed above, smaller values of the privacy budget result in stronger privacy guarantees, but at the expense of greater noise. Stated differently, larger values for each localized noise parameter $\epsilon_i$ yields smaller noise in a probabilistic manner. For each calculated median, a portion of the overall budget is consumed, thereby leaving a lower amount of the budget for additional median(s). Additionally, the privacy guarantee of the data-dependent trees is obtained by composing the individual privacy guarantees for counts along each root-to-leaf path (see example Equation 7). The resulting PSD released is deemed differentially private in a manner consistent with example Equation 24.

$$\epsilon = \Sigma_{i=0}^{h-1}\epsilon_i^m + \Sigma_{i=0}^{h}\epsilon_i^c \qquad \text{Equation 24.}$$

In the illustrated example Equation 24, the one or more noisy processes employed to calculate the medium(s) $A_i^m$ satisfy $1 \le i \le h$ that correspond to internal nodes on a path such that the noisy algorithm(s) (processes) satisfy differential privacy. Additionally, in the illustrated example Equation 24, the one or more noisy processes employed to calculate noisy counts $A_i^c$ satisfy $0 \le i \le h$ for each of the same corresponding internal nodes such that the noisy process(es) satisfy differential privacy.

Noise magnitude $\epsilon_i$ may result in one or more different consequences on an overall accuracy of the tree (for both median calculations and count calculations). A relatively large count noise results in a greater degree of uncertainty for the count of each region in the tree that intersects a query Q. On the other hand, a relatively large median noise may result in a skewed split in one or more node(s). In some examples, children nodes may become unbalanced in terms of the number of points in their corresponding leaves, and may have unbalanced split region sizes. In the event that a median split fails to divide a current point set so that there are a constant fraction of points on each side, then tree level waste occurs.

The median noise budget $\epsilon_{median}$ and the count noise budget $\epsilon_{count}$ may be represented in a manner consistent with example Equations 25 and 26, respectively. Accordingly, the overall noise budget $\epsilon$ is represented as $\epsilon = \epsilon_{count} + \epsilon_{medium}$.

$$\epsilon_{median} = \Sigma_{i=0}^{h-1}\epsilon_i^m \qquad \text{Equation 25.}$$

$$\epsilon_{count} = \Sigma_{i=1}^{h-1}\epsilon_i^c \qquad \text{Equation 26.}$$

When $\epsilon_{median}$ is fixed at a first value, it is distributed among one or more internal nodes. In some examples, distribution may occur in a uniform manner in which each level receives an equal portion of the overall median noise budget. In other examples, such as when a hybrid tree is employed that switches to a data-independent quadtree after splitting l levels, the example median budget may be split on a per level basis for $h-l \le i \le h$ and $\epsilon_i^m = 0$ for $0 \le i \le h-1$.

In addition to employing geometric noise in a hierarchical decomposition to improve query accuracy, further query optimizations may be employed after the noisy counts are calculated. Example methods and apparatus disclosed herein process the one or more differentially private output(s) from the PSD in a manner that does not affect the privacy guarantees established therein. In some examples, a tree having root a and four children nodes b, c, d and e has noisy count $Y_v$ for node v, which is an element of $\{a, b, c, d, e\}$. In the aforementioned examples, assume a uniform noise of $\epsilon/2$ is used for each count. A first estimate of a true count for root a is $Y_a$, and a second estimate includes the sum of counts of the corresponding leaves (i.e., $Y_b + Y_c + Y_d + Y_e$). An example estimate $\beta_a$ is shown in a manner consistent with example Equation 27, which is an average of both estimates, and a corresponding variance is shown in a manner consistent with example Equation 28.

$$\beta_a = \frac{Y_a}{2} + \left(\frac{Y_b + Y_c + Y_d + Y_e}{2}\right). \qquad \text{Equation 27}$$

$$\text{Var}(\beta_a) = \frac{\text{Var}(Y_a)}{4} + \frac{4\text{Var}(Y_b)}{4} \qquad \text{Equation 28}$$
$$= \left(\frac{5}{4}\right)\text{Var}(Y_a).$$

In the illustrated examples of Equation 27 and 28, the estimate for the variance of $\beta_a$ is worse than if $Y_a$ were used. Accordingly, example Equation 29, which yields example Equation 30, improves the result.

$$\beta_a = \frac{4Y_a}{5} + \frac{(Y_b + Y_c + Y_d + Y_e)}{5}. \qquad \text{Equation 29}$$

$$\text{Var}(\beta_a) = \left(\frac{4}{5}\right)\text{Var}(Y_a). \qquad \text{Equation 30}$$

For any non-uniform budgeting approach, if the budget for a is $\epsilon_1$, and the budget for its children is $\epsilon_0$, then the example Equation 31 improves the resulting accuracy, which derives example Equation 32.

$$\beta_a = \frac{4\epsilon_1^2}{4\epsilon_1^2 + \epsilon_0^2}Y_a + \frac{\epsilon_0^2}{4\epsilon_1^2 + \epsilon_0^2}(Y_b + Y_c + Y_d + Y_e). \qquad \text{Equation 31}$$

$$\text{Var}(\beta_a) = \frac{8}{4\epsilon_1^2 + \epsilon_0^2} < \frac{2}{\epsilon_1^2} \qquad \text{Equation 32}$$
$$= \text{Var}(Y_a).$$

In the illustrated examples of Equations 27 through 32, the number of choices increases in an exponential manner as tree size increases. One or more counts may be combined, including counts from ancestors, descendants, siblings, etc. To calculate an optimized solution, the ordinary least-squares (OLS) estimate may be employed as a linear statistical inference. Generally speaking, computing the OLS for n unknowns may include solving a linear system with n×n matrices. The relatively large matrices may be inverted to compute the OLS using matrix mathematics. However, the amount of time required to calculate an n×n matrix is proportional to the cube of n. Example methods and apparatus disclosed herein calculate the OLS estimate via an example linear time process to achieve the same result as calculating via matrix mathematics, but in a relatively less computationally intensive manner. Accordingly, as the size of the tree increases, the example linear time process improves the efficiency of calculating the OLS estimate. The example linear time process considers one or more inherent symmetries of the matrices defined for the tree structure and assume that all nodes at a level i have the same Laplace parameter $\epsilon_i$ (for either uniform and/or geometric budget approaches). For example, the linear time process takes advantage of inherent nodal similarities of adjacent nodes of a tree, such as relative count similarities that occur between a parent node as compared to the count of the sum of corresponding children nodes. Such similarities do not reside in traditional matrices when calculating OLS estimates. Accordingly, the time it takes to calculate the OLS estimate via the linear time process is proportional to n, rather than proportional to the cube of n as is the case with an n×n matrix approach.

The example OLS estimate denotes $f$ as the fanout of a spatial index having a height of h. Assume that h(v) denotes the height of a particular node v and, in the event the node is a leaf, then h(v)=0, and in the event the node is a root, then h(v)=h. Also assume that all paths have length h and all internal nodes have the fanout $f$, in which u>>v denotes that node u is a leaf in the subtree of v. As noted below, anc(u) denotes a set of all ancestors of u, including node u itself, and par(u) and child(u) denote the parent and children of node u, respectively. OLS is defined as a linear inference over a tree structure in which Y denotes a vector of original noisy counts (e.g., $Y_v$ is a noisy count of node v), and c, denotes a noise parameter for node v. $\beta$ represents the vector of counts after post-processing the PSD and further represents the OLS estimator if it is consistent in a manner represented by example Equation 33 and minimizes example Equation 34.

$$\beta_v = \Sigma_{u \in child(v)} \beta_u \text{ (for all nodes } v\text{)} \qquad \text{Equation 33.}$$

$$\Sigma_v \epsilon_v^2 (Y_v - \beta_v)^2 \qquad \text{Equation 34.}$$

The example OLS $\beta$ is unbiased for any query Q, and achieves a minimum error for all range queries. Example Equation 35 illustrates a manner in which $\beta$ may be computed.

$$\left(\sum_{j=0}^{h(v)} f^j \epsilon_j^2\right)\beta_v + f^{h(v)} \sum_{w \in anc(v)/\{v\}} \beta_w \epsilon_{h(w)}^2 = \sum_{u<<v} \sum_{w \in anc(u)} \epsilon_{h(w)}^2 Y_w. \qquad \text{Equation 35}$$

In the illustrated example of Equation 35, an array E of h+1 entries is computed in a manner consistent with example Equation 36.

$$E_l = \Sigma_{j=0}^l f^j \epsilon_j^2 \qquad \text{Equation 36.}$$

In the illustrated example of Equation 36, because $E_l = E_{l-1} + f_l \epsilon_l^2$, a corresponding time O(h) is taken to compute the array E. For any node v, $Z_v$ is a node transform and is defined in a manner consistent with example Equation 37, and used in a multi-phase approach to compute the OLS estimator in a time linear manner.

$$Z_v = \Sigma_{u<<v} \Sigma_{w \in anc(u)} \epsilon_{h(w)}^2 Y_w \qquad \text{Equation 37.}$$

In the illustrated example of Equation 37, $Z_v$ is computed for all nodes (v) in two linear traversals of the tree. In particular, an example first phase includes a top-down traversal of the tree, an example second phase includes a bottom-up traversal, and an example third phase includes another top-down traversal. In the example first phase, $Z_v$ is computed for all leaves v in a manner consistent with example Equation 38.

$$Z_v = \Sigma_{w \in anc(v)} \epsilon_{h(w)}^2 Y_w \qquad \text{Equation 38.}$$

In a top-down traversal of the first phase, let $\alpha_{root} = \epsilon_h^2 Y_{root}$, and compute for each node u: $\alpha_u = \alpha_{par(u)} + \epsilon_{h(u)}^2 Y_u$. When a leaf v is reached, set $Z_v = \alpha_v$.

In the example second phase, $Z_v$ is computed for all internal nodes v in a manner consistent with example Equation 39. Example phase two is a single bottom-up traversal.

$$Z_v = \Sigma_{u \in child(v)} Z_u \qquad \text{Equation 39.}$$

In the example third phase, $\beta_v$ is computed for all nodes v. During the computation of $\beta_v$, an auxiliary value $F_v$ is computed and is defined in a manner consistent with example Equation 40.

$$F_v = \Sigma_{w \in anc(v)/\{v\}} \beta_w \epsilon_{h(w)}^2 \qquad \text{Equation 40.}$$

In the illustrated example of Equation 35, v=root is represented in a manner consistent with example Equation 41.

$$(\Sigma_{j=0}^h f^j \epsilon_j^2)\beta_{root} = (\epsilon_h \beta_{root}) = Z_{root} \qquad \text{Equation 41.}$$

A computation of $\beta_{root}$ reveals $\beta_{root} = Z_{root}/E_h$ and, if $F_{root} = 0$, for any node v not equal to root, compute $F_v$ in a manner consistent with example Equation 42.

$$F_v = F_{par(v)} + \beta_{par(v)} \epsilon_{h(v)+1}^2 \qquad \text{Equation 42.}$$

Using example Equation 35, $Z_{root}$ is identified in a manner consistent with example Equation 43.

$$\beta_v = \frac{Z_v - f^{h(v)} \sum_{w \in anc(v)/\{v\}} \beta_w \epsilon_{h(w)}^2}{E_{h(v)}} \qquad \text{Equation 43}$$
$$= \frac{Z_v - f^{h(v)} F_v}{E_{h(v)}}.$$

Accordingly, the example first, second, and third phases computes the OLS estimator in a time linear manner and improves the query accuracy.

Figure 4:
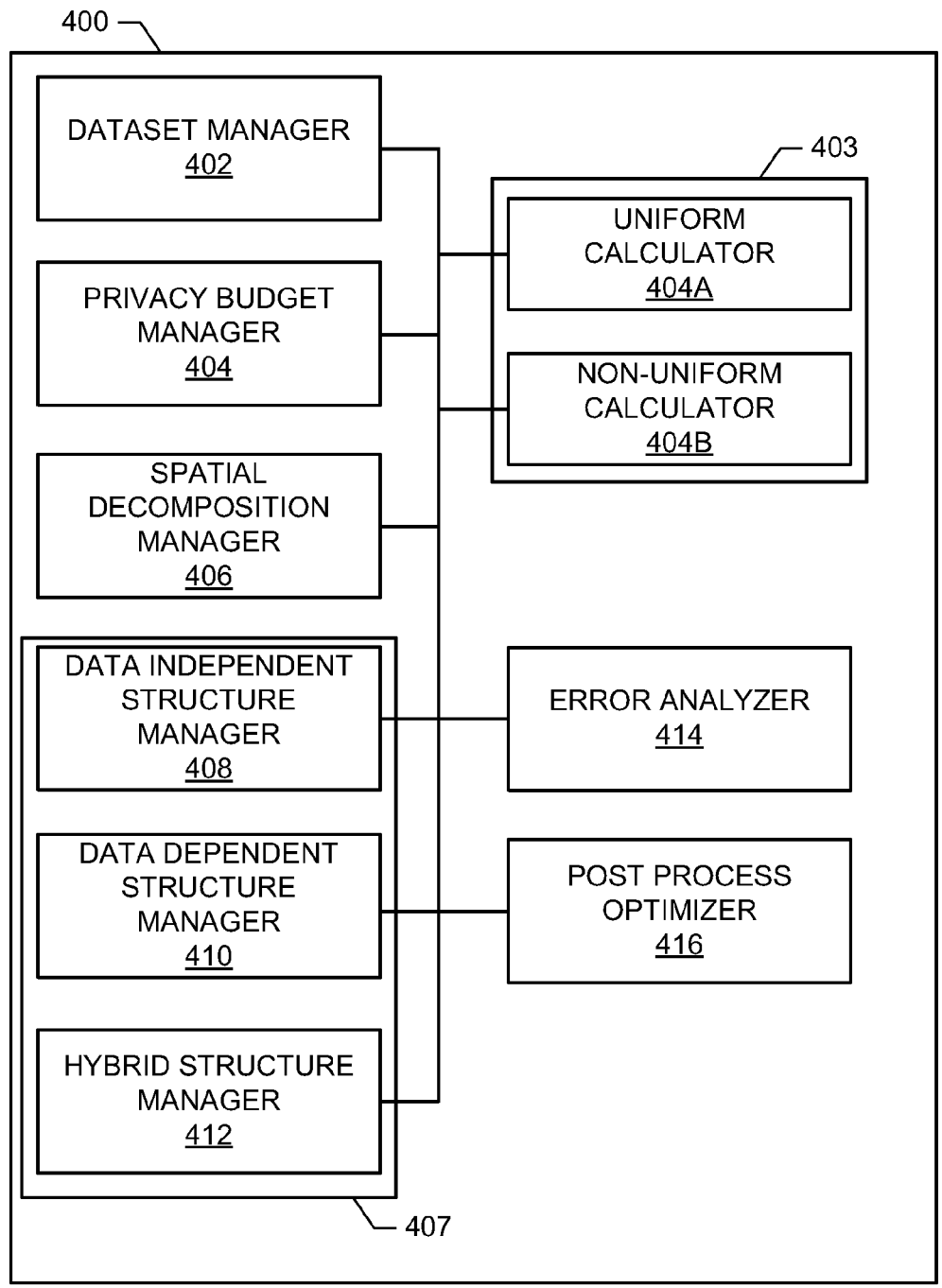
FIG. 4 is a schematic illustration of an example differential privacy engine to privatize a dataset of spatial data.

FIG. 4 is a schematic illustration of an example differential privacy engine 400 to privatize a spatial dataset for public distribution. In the illustrated example of FIG. 4, the differential privacy engine 400 includes a dataset manager 402, a noise allocation engine 403, a privacy budget manager 404, a uniform calculator 404A, a non-uniform calculator 404B, a spatial decomposition manager 406, a tree structure engine 407, and a data independent structure manager 408. The example differential privacy engine of FIG. 4 also includes a data dependent structure manager 410, a hybrid structure manager 412, an error analyzer 414 and a post-process optimizer 416.

In operation, the example differential privacy engine 400 employs the dataset manager 402 to obtain a dataset of interest for privatization. In some examples, a dataset that includes some information deemed private and/or otherwise sensitive in the event of accidental release and/or breach is privatized to remove such sensitive information. The removal of the sensitive information may render the resulting processed dataset unusable if too much noise is applied to the privatization process and, on the other hand, if too little noise is applied to the original dataset, then personal information may be released. The example privacy budget manager 404 establishes a privacy budget value, which balances concerns for privacy of the dataset with a corresponding utility of the dataset for one or more queries.

The privatization of a dataset may employ any type of spatial indexing method to generate a spatial decomposition of the dataset, which is selected by the example spatial decomposition manager 406. For example, some datasets may be processed in a data-independent manner, which means that subdividing the dataset in a spatial manner does not adversely affect a privacy concern related to individuals associated with the information of the dataset. For datasets built with a data-independent decomposition (e.g., a quadtree), split locations may be determined based on one or more bounding regions (e.g., splitting rectangles into two or four sections of equal area). On the other hand, some datasets processed in a data-dependent manner may reveal clues and/or information that may allow an attacker to identify one or more individuals based on the spatial arrangement of the information in the dataset. For example, if an attacker knows that three people in a particular zip code earn over $100 k per year in a rural subdivision, then a spatial split of the dataset based on population density may reveal which individual dataset points correspond to the three people of interest. In other examples, publicly available U.S. Census data may be employed to derive information when combined with a dataset that would otherwise be considered private. As such, the example tree structure engine 407 invokes the example data independent structure manager 408 to generate data-independent spatial indexing structures, such as quadtrees. Additionally, the example tree structure engine 407 invokes the example data dependent structure manager 410 to generate data-dependent spatial indexing structures, such as kd-trees. Data-dependent decompositions (e.g., kd-tree indexing structures) use the distribution of the dataset within a region to determine where to split. Still further, the example tree structure engine 407 invokes the example hybrid structure manager 412 to generate combined data-independent and data-dependent structures to improve query accuracy when calculating node splits and/or node counts during a privatization process.

During the privatization process, the example privacy budget manager 404 calculates a localized noise parameter via the example noise allocation engine 403 for each node in the tree associated with the dataset, which facilitates calculation of noisy counts for each portion of the tree. The example noise allocation engine 403 includes the example uniform calculator 404A to calculate noisy counts in a uniform manner, and an example non-uniform calculator 404B to calculate noisy counts in a non-uniform manner, such as via a geometric sequence. The example error analyzer 414 calculates a corresponding error of the privatization for each node and compares the results to one or more thresholds. In the event one or more thresholds are triggered by the error analysis (e.g., an error is lower than a threshold, an error is greater than a threshold, etc.), the example error analyzer 414 may modify a tree height (h) and/or one or more localized noise parameters (c).

After the PSD is generated, the example post process optimizer 416 is invoked by the differential privacy engine 400 to improve query accuracy for a query of the privatized dataset. Optimization may include, but is not limited to establishing a baseline accuracy and employing ordinary least squares (OLS) to improve query accuracy.

While an example manner of implementing the differential privacy engine 400 has been illustrated in FIGS. 1, 2A, 2B and 3, one or more of the elements, processes and/or devices illustrated in FIGS. 1, 2A, 2B and/or 3 may be combined, divided, re-arranged, omitted, eliminated and/or implemented in any other way. Further, the example differential privacy engine 400, the example dataset manager 402, the example noise allocation engine 403, the example privacy budget manager 404, the example uniform calculator 404A, the example non-uniform calculator 404B, the example spatial decomposition manager 406, the example data independent structure manager 408, the example data dependent structure manager 410, the example hybrid structure manager 412, the example error analyzer 414 and/or the example post process optimizer 416 of FIG. 4 may be implemented by hardware, software, firmware and/or any combination of hardware, software and/or firmware. Thus, for example, any of the example differential privacy engine 400, the example dataset manager 402, the example noise allocation engine 403, the example privacy budget manager 404, the example uniform calculator 404A, the example non-uniform calculator 404B, the example spatial decomposition manager 406, the example tree structure engine 407, the example data independent structure manager 408, the example data dependent structure manager 410, the example hybrid structure manager 412, the example error analyzer 414 and/or the example post process optimizer 416 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example differential privacy engine 400, the example dataset manager 402, the example noise allocation engine 403, the example privacy budget manager 404, the example uniform calculator 404A, the example non-uniform calculator 404B, the example spatial decomposition manager 406, the example tree structure engine 407, the example data independent structure manager 408, the example data dependent structure manager 410, the example hybrid structure manager 412, the example error analyzer 414 and/or the example post process optimizer 416 are hereby expressly defined to include a tangible computer readable medium such as a memory, DVD, CD, BluRay, etc. storing the software and/or firmware. Further still, the example differential privacy engine 414 of FIG. 4 may include one or more elements, processes and/or devices in addition to, or instead of, those illustrated in FIGS. 1, 2A, 2B, 3 and/or 4 and/or may include more than one of any or all of the illustrated elements, processes and devices.

Figure 5:
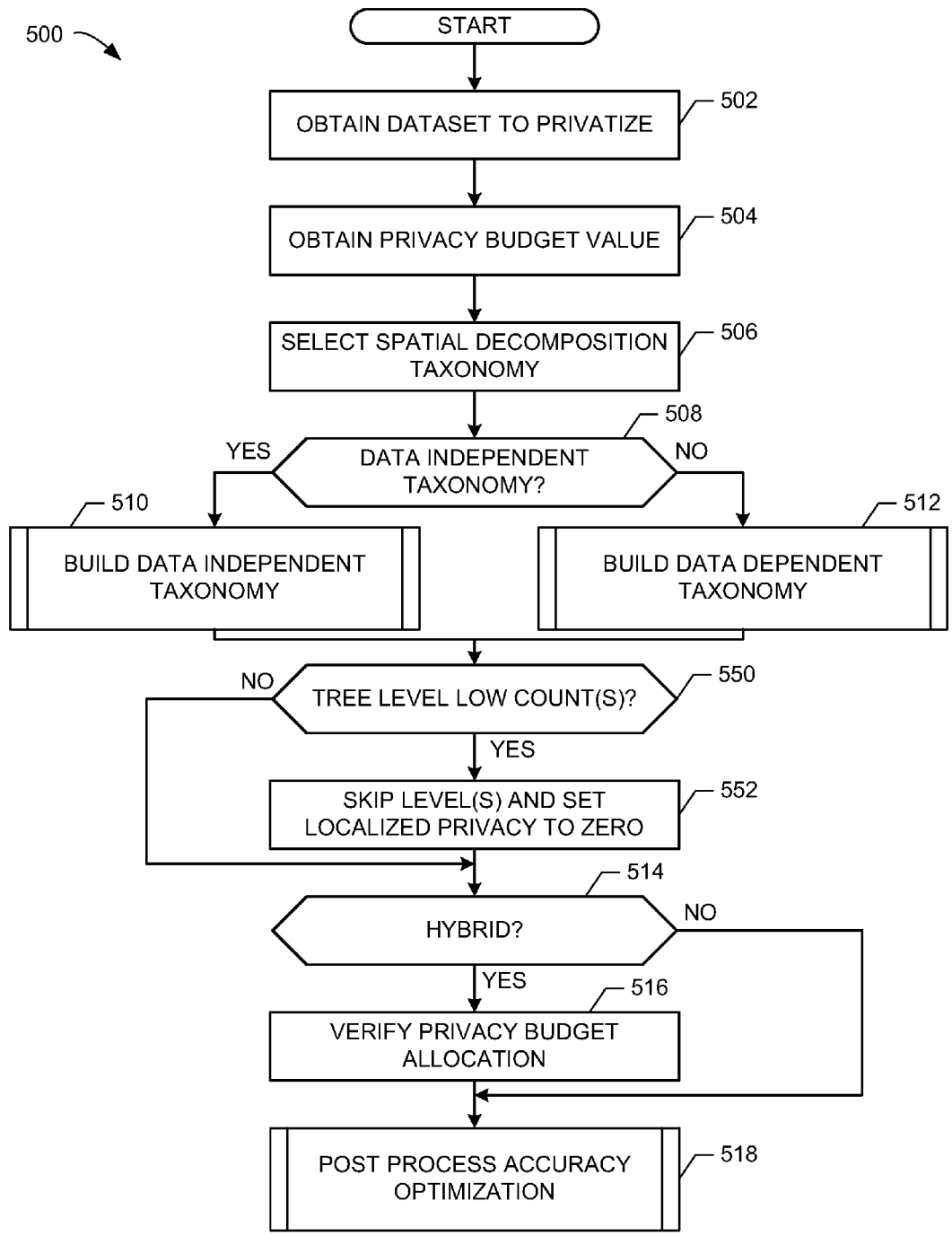
FIGS. 5-9 are flowcharts representative of example machine readable instructions which may be executed to perform privatization of a dataset of spatial data, to implement the example differential privacy engine of FIG. 4, and/or to build the indexing structures and trees of FIGS. 1, 2A, 2B and 3.

A flowchart representative of example machine readable instructions for implementing the differential privacy engine 400 of FIG. 4 is shown in FIG. 5. In this example, the machine readable instructions 500 comprise a program for execution by a processor such as the processor 1012 shown in the example computer 1000 discussed below in connection with FIG. 10. The program may be embodied in software stored on a tangible computer readable medium such as a CD-ROM, a floppy disk, a hard drive, a digital versatile disk (DVD), a BluRay disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 5, many other methods of implementing the example differential privacy engine 400 may alternatively be used. For example, the order of execution of the blocks may be changed, and/or some of the blocks described may be changed, eliminated, or combined.

As mentioned above, the example processes of FIGS. 5-9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program 500 of FIG. 5 begins at block 502 in which the example dataset manager 402 obtains a dataset of interest to privatize. Datasets are originally in a non-privatized state and may include individual names (e.g., names of subscribers), street addresses, social security numbers, etc. While explicitly removing names, street addresses and/or social security numbers may help eliminate one or more privacy concerns for corresponding individuals, the remaining information may allow an attacker to derive private information when one or more combinations of alternate data are combined with the dataset. Examples of alternate data that may be used in combination with a dataset to derive personal information include, but are not limited to, U.S. Census Bureau information, municipal records and/or records released that comply with the Freedom of Information Act (e.g., agency record release requirements). The example privacy budget manager 404 obtains and/or otherwise generates a privacy budget value to be utilized during a privatization process of the dataset (block 504). As discussed above in connection with example Equation 2, $\epsilon$-differential privacy is achieved when no individual tuple can significantly affect released information because an output distribution generated by a privacy process (e.g., algorithm A) is nearly the same whether or not any tuple of interest is present in the dataset or not.

The example spatial decomposition manager 406 selects a spatial decomposition taxonomy (block 506), such as a data-independent quadtree or a data-dependent kd-tree. In the event the dataset of interest is to be privatized via a data-independent taxonomy (block 508), the example tree structure engine 407 invokes the example data independent structure manager 408 to build the quadtree structure (e.g., the quadtree 100 of FIG. 1) with the dataset of interest (block 510), as described in further detail below. On the other hand, in the event the dataset of interest is to be privatized via a data-dependent taxonomy (block 508), the example tree structure engine 407 invokes the example data-dependent structure manager 410 to build the kd-tree structure (e.g., the kd-tree 300 of FIG. 3) with the dataset of interest (block 512), as described in further detail below. The example non-uniform calculator 404b determines whether one or more noisy nodes of the tree contains any voids and/or nodes having substantial insignificance (block 550). For example, after the noisy counts are calculated, some nodes of the tree may be associated with particularly and/or relatively low noisy counts (e.g., due to relatively sparse densities associated with the original counts) and, further division of the area may be unproductive. For tree nodes devoid of a substantial data representation (e.g., due to low noisy counts determined via one or more thresholds), the example non-uniform calculator 404b skips the one or more level(s) and sets a localized privacy value $\epsilon_i$ to zero (block 552) so that the remaining noise budget $\epsilon$ may be applied to one or more alternate nodes.

In some examples, the privatization process 500 employs a hybrid taxonomy of data dependent and data independent structures (block 514), in which case splits of the dataset occur first before privatization of node counts (block 516). During the hybrid privatization, the budget allocation is verified to remain within the limits set by the example privacy budget manager 404 (block 516). One or more post process optimizations may occur with the generated PSD, such as application of an ordinary least-squares (OLS) estimate to optimize query accuracy without affecting the privacy guarantee of previously determined splits and/or node counts (block 518).

Figure 6:
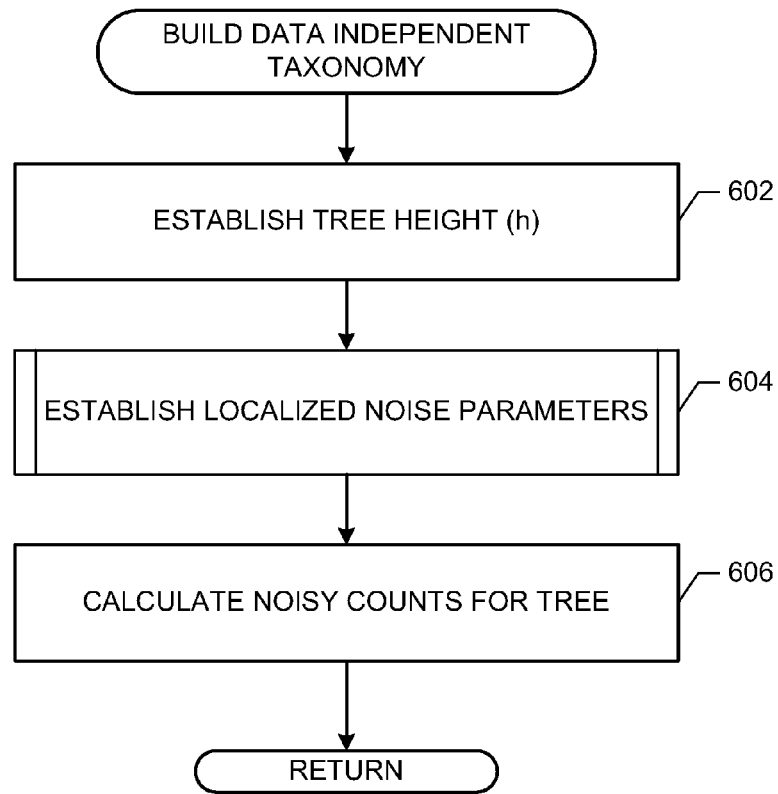

FIG. 6 illustrates additional detail associated with building a data independent taxonomy (block 510) of FIG. 5. In the illustrated example of FIG. 6, the example privacy budget manager 404 establishes a height (also referred to herein as tree depth) of the tree (block 602). For each node of the tree, the example privacy budget manager 404 establishes a localized noise parameter $\epsilon_i$ (block 604). As described in further detail below, localized noise parameters may be computed in a uniform manner throughout the tree and/or may apply one or more non-uniform techniques, such as a geometric noise distribution in an effort to reduce query error(s). Each node of the data-independent tree is calculated to generate a noisy count (block 606), such as by way of a Laplace mechanism. An example Laplace mechanism is described above in connection with example Equations 4 and 5. The example error analyzer 414 analyzes the resulting noisy counts of the tree to determine an error metric, which may be performed by calculating a variance of a query. Generally speaking, the variance is a strong indicator of query accuracy, and minimizing it for most queries may lead to an improved utility of the published privatized dataset.

Figure 7:
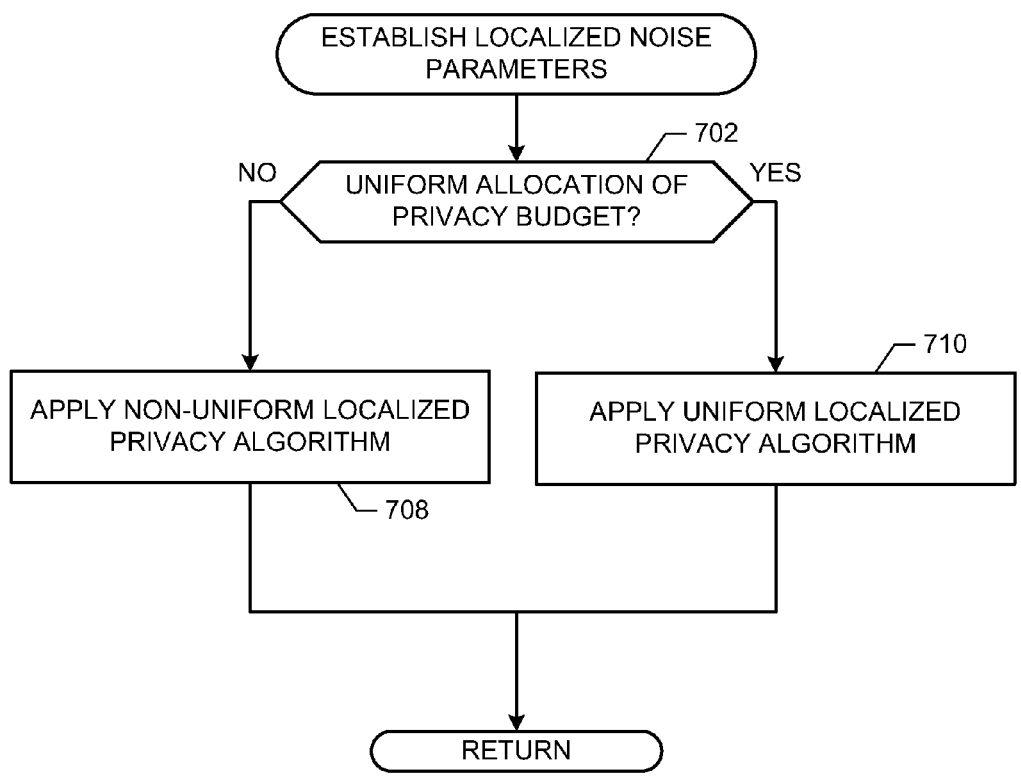
Figure 8:
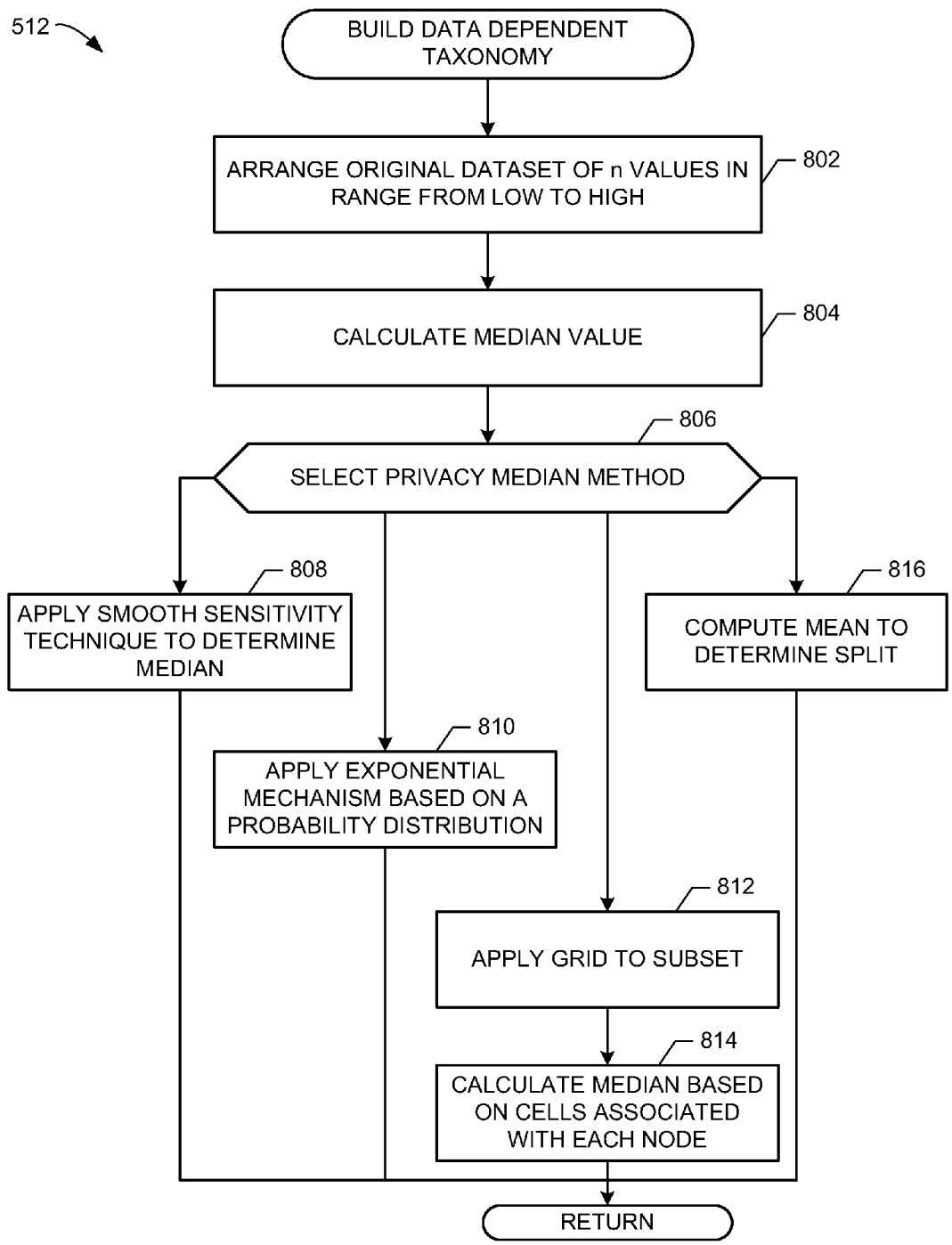
Figure 9:
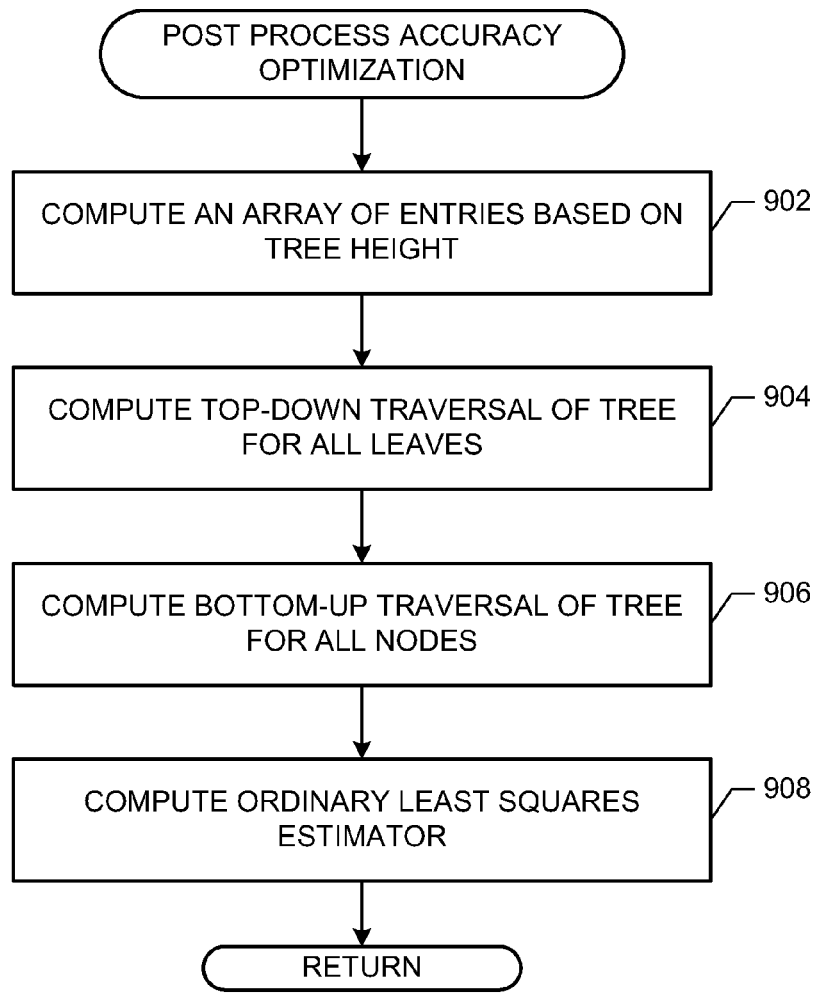

FIG. 7 illustrates additional detail associated with establishing localized noise parameters (block 604) of FIG. 6. In the illustrated example of FIG. 7, the example privacy budget manager 404 determines whether to apply a uniform allocation of the privacy budget $\epsilon$ (block 702). If a non-uniform allocation of the privacy budget $\epsilon$ is selected, which may be based on a heuristic guide/pattern, or based on empirical testing, one or more non-uniform localized privacy process (es) may be applied to the node(s) (block 708), such as noise generation in a manner consistent with example Equation 16.

If uniform allocation of the privacy budget $\epsilon$ is selected, the example uniform calculator 404a applies one or more localized noise parameters among all the nodes of the tree in a uniform manner (block 710). For example, the uniform calculator 404a may apply localized noise parameters in a manner consistent with example Equation 13.

Briefly returning to FIG. 5, in the event the dataset of interest is to be privatized via a data-dependent taxonomy (block 508), the example data-dependent structure manager 410 builds a data-dependent structure representation, such as the example kd-tree of FIG. 3 (block 512). In the illustrated example of FIG. 8, the data-dependent structure manager 410 arranges the original dataset of n values from low to high (block 802). Based on the dataset distribution, the example data-dependent structure manager 410 calculates median value(s) for any number of tree splits (block 804). Simply using the calculated median may diminish the privacy of the dataset, so a privacy median calculation method is selected (block 806). As described above, each of the example median calculation methods exhibit particular strengths and/or weaknesses and include a smooth sensitivity method (block 808), an exponential mechanism (block 810), a cell-based method that applies a grid to the dataset (block 812) and calculates the median based on cells associated with each node (block 814), and/or a noisy mean technique (block 816).

Returning to FIG. 5, one or more post-processing optimizations (block 518) may apply the OLS estimation on a generated PSD to optimize query accuracy in a manner that does not affect the privacy guarantee of previously calculated splits and/or node counts. In the illustrated example of FIG. 9, the example post process optimizer 416 computes an array of entries based on the tree height (block 902), as described above in connection with example Equation 36. A first phase includes computing a top-down traversal of all leaves of the tree for all nodes (block 904) in a manner consistent with example Equation 38. Additionally, the example post process optimizer 416 computes a bottom-up traversal of the tree for all nodes (block 906) in a manner consistent with example Equation 39. A third example phase computes an OLS estimator ($\beta_v$) (block 908) in a manner consistent with example Equation 40.

Figure 10:
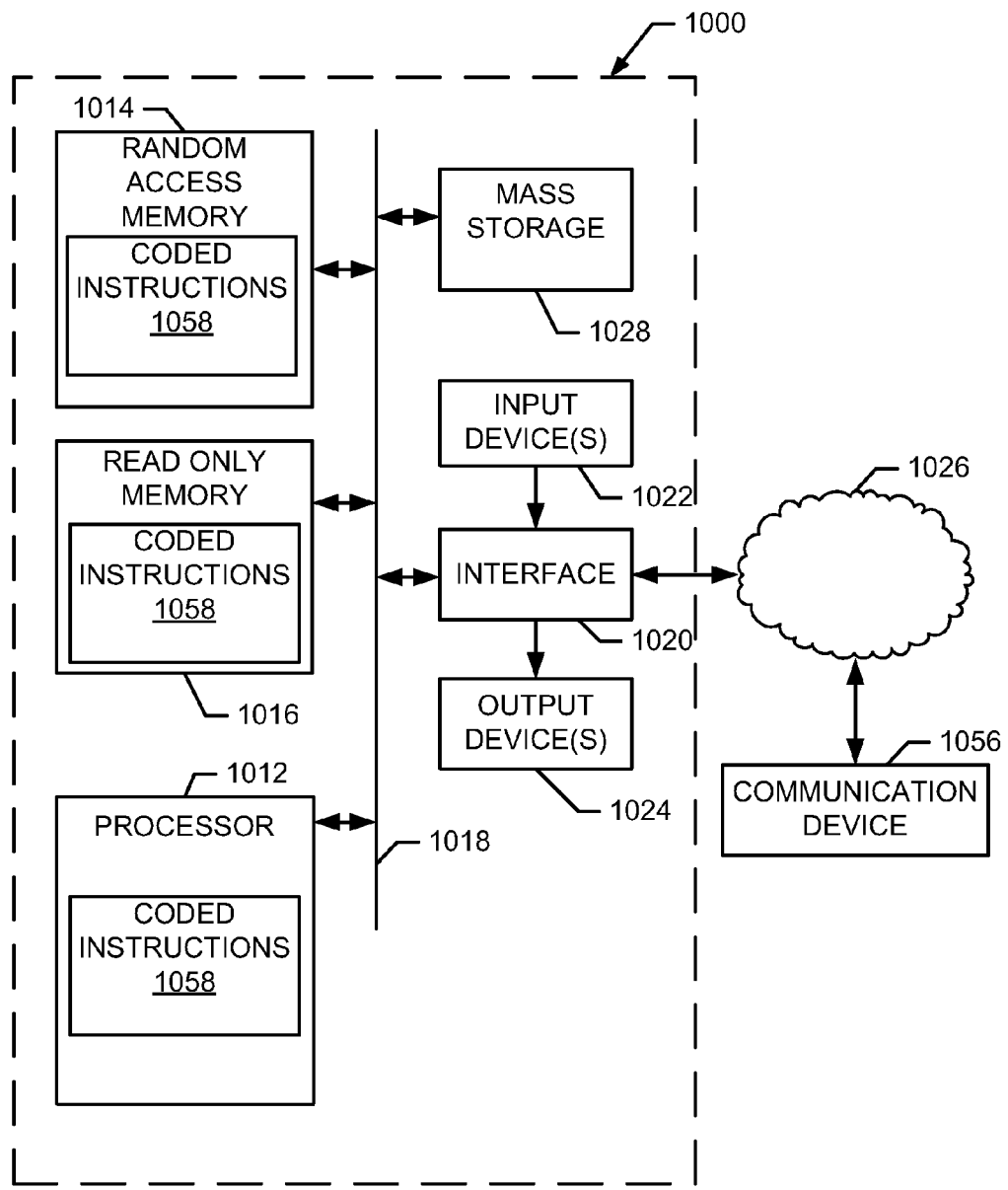
FIG. 10 is a block diagram of an example system that may execute the example machine readable instructions of FIGS. 5-9 to implement the example differential privacy engine of FIG. 4, and/or to build the indexing structures and trees of FIGS. 1, 2A, 2B and 3.

FIG. 10 is a block diagram of an example computer 1000 capable of executing the instructions of FIGS. 5-9 to implement the differential privacy engine 400 of FIG. 4. The computer 1000 can be, for example, a server, a personal computer, a mobile phone (e.g., a cell phone). a personal digital assistant (PDA), an Internet appliance, a gaming console, a set top box, or any other type of computing device.

The computer 1000 of the instant example includes a processor 1012. For example, the processor 1012 can be implemented by one or more microprocessors or controllers from any desired family or manufacturer.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The computer 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device (e.g., communication device 1056) such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives.

The coded instructions 1058 of FIGS. 5-9 may be stored in the mass storage device 1028, in the volatile memory 1014, in the non-volatile memory 1016, and/or on a removable storage medium such as a CD or DVD.

From the foregoing, it will be appreciated that the above disclosed methods, apparatus and articles of manufacture facilitate privatization of spatial data in a manner that satisfies differential privacy standards, guarantees and/or expectations, such as those defined by example Equation 2. While prior techniques to privatize spatial data employed applying a blanket noise value over the entirety of spatial data to obscure true localized details, such blanket application of noise caused a substantial error of the resulting dataset, rendering the dataset unusable for one or more queries.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to anonymize a dataset of spatial data, comprising:
   generating, via a processor, a spatial indexing structure with spatial data;
   establishing a height value associated with the spatial indexing structure to generate a plurality of tree nodes, each of the tree nodes associated with a respective spatial data count;
   calculating localized noise budget values for respective ones of the tree nodes based on the height value and an overall noise budget;
   anonymizing the tree nodes with an anonymization process, the anonymization process using the localized noise budget values for respective ones of the tree nodes;
   calculating error metrics for respective ones of the tree nodes;
   comparing the error metrics to a threshold; and
   if the error metric for one of the tree nodes exceeds the threshold, modifying at least one of the height value or the localized noise budget value for the one of the tree nodes by applying an ordinary least squares estimate.

2. A method as described in claim 1, wherein the localized noise budget value is set to zero for a first one of the tree nodes when a noisy data count associated with the first one of the tree nodes is below a threshold value.

3. A method as described in claim 1, further comprising generating a plurality of splits to form the spatial indexing structure.

4. A method as described in claim 3, further comprising applying a quadtree spatial indexing structure to generate the plurality of splits independent of the spatial data.

5. A method as described in claim 3, further comprising applying a kd-tree spatial indexing structure to generate the plurality of splits based on the spatial data.

6. A method as described in claim 1, wherein calculating the error metrics comprises analyzing noisy counts for the tree nodes.

7. A method as described in claim 6, wherein modifying at least one of the height value or the localized noise budget value by applying an ordinary least squares estimate comprises adjusting the noisy counts by computing an ordinary least squares estimate of the noisy counts without affecting a plurality of splits or node counts.

8. A method as described in claim 7, further comprising calculating a node transform for leaves associated with the tree nodes via a first top-down traversal of the spatial indexing structure.

9. A method as described in claim 8, further comprising calculating a node transform of internal nodes via a second bottom-up traversal of the spatial indexing structure based on the node transform of the first top-down traversal.

10. A method as described in claim 9, further comprising calculating the ordinary least squares estimate of the noisy counts via a third top down traversal of the spatial indexing structure based on the node transform of the second bottom-up traversal.

11. An apparatus to anonymize a dataset of spatial data, comprising:
    a spatial decomposition manager to generate a spatial indexing structure with spatial data, the spatial decomposition manager to establish a height value associated with the spatial indexing structure to generate a plurality of tree nodes, the tree nodes associated with respective spatial data counts;
    a privacy budget manager to calculate a localized noise budget values for respective ones of the tree nodes based on the height value and an overall noise budget;
    a noise allocation engine to anonymize the tree nodes with an anonymization process, the anonymization process using respective ones of the localized noise budget values for respective ones of the tree nodes; and
    an error analyzer to:
        calculate error metrics for the tree nodes;
        compare the error metrics to a threshold; and
        if the error metric for one of the tree nodes exceeds the threshold, modify at least one of the height value or the localized noise budget value for the one of the tree nodes by applying an ordinary least squares estimate.

12. An apparatus as described in claim 11, further comprising a non-uniform calculator to allocate a geometric sequence for the tree nodes.

13. An apparatus as described in claim 11, further comprising a data independent structure manager to generate a plurality of splits to form the spatial indexing structure.

14. An apparatus as described in claim 13, wherein the data independent structure manager is to generate a quadtree spatial indexing structure to generate the plurality of splits independent of the spatial data.

15. An apparatus as described in claim 13, wherein the data dependent structure manager is to generate a kd-tree spatial indexing structure to generate the plurality of splits based on a distribution of the spatial data.

16. A tangible machine readable storage device or storage disk comprising instructions that, when executed, cause a machine to perform a method comprising:
    generating a spatial indexing structure with spatial data;
    establishing a height value associated with the spatial indexing structure to generate a plurality of tree nodes, the tree nodes associated with respective spatial data counts;
    calculating a localized noise budget value for respective ones of the tree nodes based on the height value and an overall noise budget;
    anonymizing the tree nodes with an anonymization process, the anonymization process using the localized noise budget value for respective ones of the tree nodes;
    calculating error metrics for the tree nodes;
    comparing the error metrics for the tree nodes to a threshold; and
    if the error metric for one of the tree nodes exceeds the threshold, modifying at least one of the height value or the localized noise budget value for the one of the tree nodes by applying an ordinary least squares estimate.

17. A tangible machine readable storage device or storage disk as described in claim 16 wherein anonymizing the tree nodes comprises applying a Laplace mechanism to anonymize each one of the tree nodes.

18. A tangible machine readable storage device or storage disk as described in claim 16 wherein the method further comprises converting the spatial data counts to noisy data counts.

19. A tangible machine readable storage device or storage disk as described in claim 16 wherein the method further comprises allocating a geometric sequence for the tree nodes.

20. A tangible machine readable storage device or storage disk as described in claim 16 wherein calculating the error metrics further comprises analyzing noisy counts for each of the tree nodes.

21. A tangible machine readable storage device or storage disk as described in claim 20 wherein modifying at least one of the height value or the localized noise budget value by applying an ordinary least squares estimate comprises adjusting the noisy counts by computing an ordinary least squares estimate of the noisy counts without affecting a plurality of splits or node counts.

* * * * *